P. L. BRADFORD.
SPEED REGULATOR.
APPLICATION FILED OCT. 8, 1910.
1,027,640.
Patented May 28, 1912.
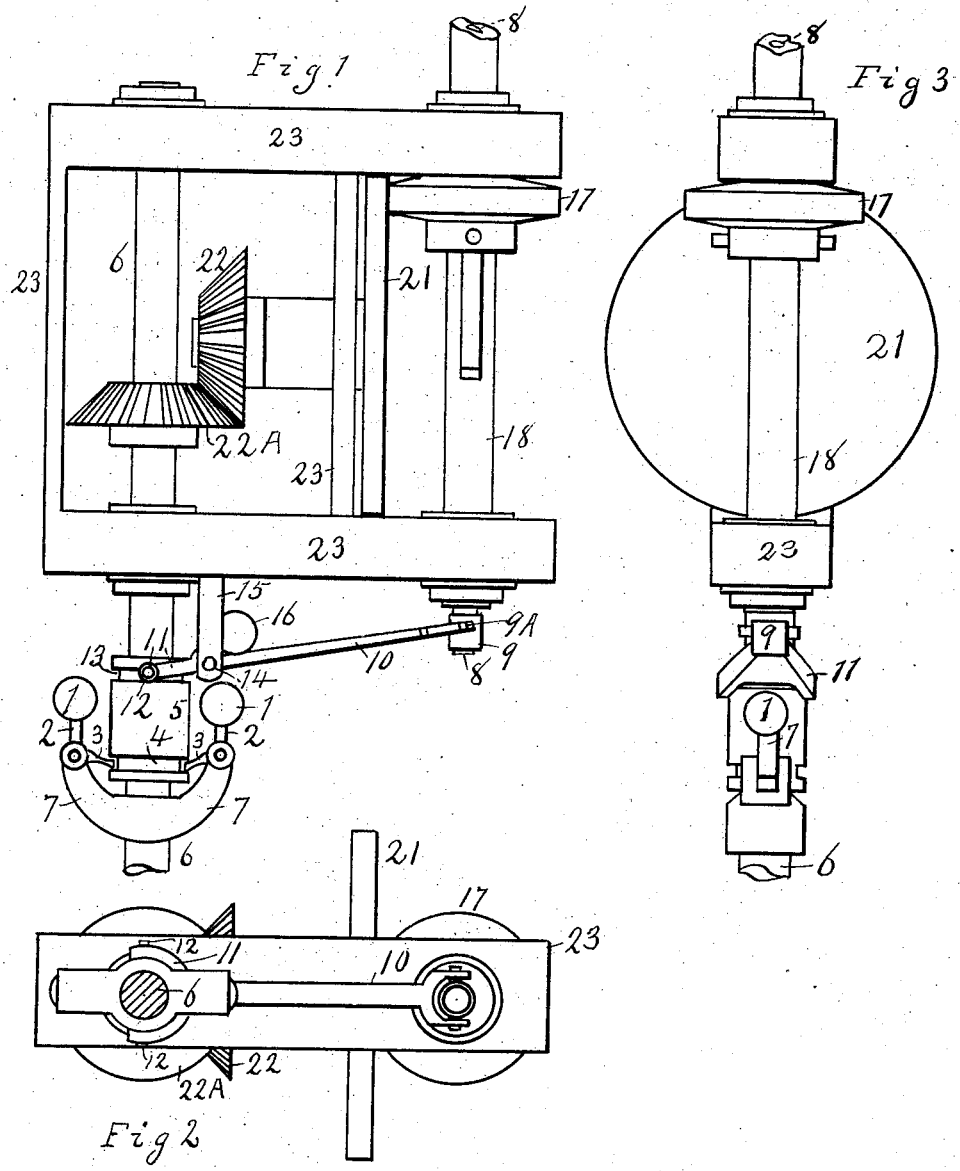
WITNESSES:
INVENTOR
P. L. Bradford
BY
Edward N. Thompson
ATTORNEY

UNITED STATES PATENT OFFICE.

PERCIVAL L. BRADFORD, OF CHICAGO, ILLINOIS.

SPEED-REGULATOR.

1,027,640.  Specification of Letters Patent.  Patented May 28, 1912.

Application filed October 8, 1910. Serial No. 585,941.

*To all whom it may concern:*

Be it known that I, PERCIVAL L. BRADFORD, a citizen of the United States of America, and resident of Chicago, in the county of Cook and State of Illinois, have invented certain new and useful Improvements in Speed-Regulators, of which the following is a specification.

My invention relates to means for converting a variable speed of rotation into a constant rotary speed.

The special use to which the invention may be applied is the driving of an electric generator to give a constant voltage independently of the variable speed of the driving shaft.

Figure 1 is an elevation of the whole device. Fig. 2 is an end view of a portion of the machine, the governor in part being omitted. Fig. 3 is a view at right angles to Fig. 1.

The construction is set forth in the accompanying drawing.

1 represents the balls of a centrifugal governor carried by bell cranks 2, whose handles are at 3 which slide in an annular groove 4 in a sleeve 5, which may slide on the variable speed shaft 6, while the yoke 7 of the governor is fastened to said shaft 6. The bell cranks 2 are fastened to this yoke. 8 is a second shaft. The loose sleeve 9 thereon is joined by a pin 9ᴬ and a connecting lever 10 to a yoke 11, having pins 12, which may slide in a groove 13, cut into the sleeve 5.

14 is the pivot pin of the lever 10, carried by a stationary support 15.

At 16 is a retractile spring for the lever 10.

At 17, is a friction gear wheel mounted to turn with the hollow shaft 18, which is loose on the shaft 8, but may slide on the latter because a pin 19 fastens the wheel 17, to the shaft 8 by passing through a long slot at 20 in the hollow shaft. The pin 19 is also fixed to the wheel 17. When the shaft 8 is moved to and fro, the wheel 17 travels with said shaft. The wheel 17 bears against the large disk 21, which is connected by bevel gears 22 and 22ᴬ to the variable speed shaft 6.

23 represents the frame for supporting the various shafts and elements named above.

The operation becomes obvious by simply saying that the movement of the governor causes through the mechanisms described, the wheel 17 to move nearer the center of the disk 21, if the speed of the shaft 6 increases, and nearer the circumference of the disk 21, if the speed of the shaft 6 decreases.

I claim as my invention;—

1. The combination of a variable speed shaft, a governor actuated thereby, a disk geared to said shaft, a friction gear wheel bearing on said disk, and means controlled by said governor for moving said wheel to and from the center of said disk according to the speed of said shaft.

2. The combination of a variable speed shaft, a governor yoke fastened thereto, a sleeve on said shaft and movable longitudinally thereon, and rotary therewith, and having an annular groove therein, bell cranks pivoted to said yoke, a governor ball on one arm of each bell crank, the other arms of the bell cranks being slidable in said grooves, said sleeve having a second annular groove, a pivoted lever, a yoke thereon, with pins sliding in said second groove, a second shaft, a sleeve thereon, connected with said lever, by which the second shaft is moved longitudinally under the action of the governor, a hollow shaft on said second shaft, a friction gear wheel movable along said hollow shaft, but fastened to said second shaft, and gearing between said friction wheel and said first named shaft.

PERCIVAL L. BRADFORD.

Witnesses:
DE FOR DE TAR,
JAMES H. FLETCHER.

Copies of this patent may be obtained for five cents each, by addressing the "Commissioner of Patents, Washington, D. C."